United States Patent [19]
Holst et al.

[11] Patent Number: 6,058,447
[45] Date of Patent: May 2, 2000

[54] HANDSHAKE CIRCUIT AND OPERATING METHOD FOR SELF-RESETTING CIRCUITS

[75] Inventors: John Christian Holst, San Jose; Dennis Lee Wendell, Pleasanton, both of Calif.

[73] Assignee: Advanced Micro Devices, Inc., Sunnyvale, Calif.

[21] Appl. No.: 08/938,190

[22] Filed: Sep. 26, 1997

[51] Int. Cl.[7] .............................. G06F 13/42; G06F 13/00

[52] U.S. Cl. ......................... 710/105; 710/18; 711/118; 711/154; 711/166; 713/1; 713/600; 714/23

[58] Field of Search ..................................... 395/285, 559; 711/118, 128, 166, 154; 710/105, 18; 713/1, 600; 714/23

[56] References Cited

U.S. PATENT DOCUMENTS

| | | | |
|---|---|---|---|
| 5,386,518 | 1/1995 | Reagle et al. | 710/130 |
| 5,565,798 | 10/1996 | Durham et al. | 326/93 |
| 5,740,412 | 4/1998 | Chan et al. | 713/600 |

*Primary Examiner*—Xuan M. Thai
*Attorney, Agent, or Firm*—Skjerven, Morrill, MacPherson, Franklin & Friel, LLP

[57] ABSTRACT

In a circuit that generates a plurality of dynamic signals in a self-resetting signal path, none of which may occur in some cycles, a handshake circuit generates a signal indicative of whether none of the signals occurred and incorporates the plurality of dynamic signals and the signal indicative that none of the signals occurred into a handshake signal. The handshake circuit generates a "normal operation" signal designating that one of the plurality of dynamic signals occurred. The handshake circuit also generates a "reset" signal indicative that none of the signals occurred.

9 Claims, 9 Drawing Sheets

HANDSHAKE CIRCUIT AND OPERATING METHOD FOR SELF-RESETTING CIRCUITS

BACKGROUND OF THE INVENTION

1. Field of the Invention

The present invention relates to timing circuits, systems, and control methods. In more specific applications, the invention relates to timing adjustment circuits for self-resetting circuits.

2. Description of the Related Art

Microprocessor architectures are continually evolving to improve and extend the capabilities of personal computers. Execution speed, power consumption, and circuit size are aspects of microprocessors and microprocessor performance that are constantly addressed by processor architects and designers in the ongoing quest for an improved product. Execution speed not only depends on the clock rate of a processor, but also upon the speed of interfaces such as cache memories and buses that supply instructions and data for execution by a processor core. The execution speed of microprocessors is heavily analyzed and compared using standard benchmark tests for judging the performance of competing entries into the microprocessor market.

One technique for increasing the operating speed of microprocessors is the usage of fast dynamic logic rather than static logic. However, the usage of dynamic logic involves some risk of incorrect performance due to timing glitches. For example, the detection of one signal of multiple timing signals that may or may not occur, depending on the signals, is a difficult problem. In this example, no signal is inherently generated that indicates that no signals occurred. The function of determining that no signal occurred for a dynamic comparator is a challenge since the signals are dynamic and exist for only a finite pulse width. A first and second signal are compared. If the first signal is reset before the second signal is asserted, no match can possibly be detected.

What is needed is a technique for accurately coordinating timing of self-resetting circuits.

SUMMARY

In a circuit that generates a plurality of dynamic signals in a self-resetting signal path, none of which may occur in some cycles, a handshake circuit generates a signal indicative of whether none of the signals occurred and incorporates the plurality of dynamic signals and the signal indicative that none of the signals occurred into a handshake signal. The handshake circuit generates a "normal operation" signal designating that one of the plurality of dynamic signals occurred. The handshake circuit also generates a "reset" signal indicative that none of the signals occurred.

In a circuit that generates a plurality of dynamic signals in a self-resetting signal path, none of which may occur in some cycles, and a signal indicative of whether none of the signals occurred. A handshake circuit incorporates the plurality of dynamic signals and the signal indicative that none of the signals occurred into a handshake signal. The handshake circuit generates a "normal operation" signal designating that one of the plurality of dynamic signals occurred. The handshake circuit also generates a "reset" signal indicative that none of the signals occurred.

The reset signal allows the circuit to gracefully terminate a cycle and begin preparation for a next cycle.

A cache includes a tag comparison circuit and a multiplexer that perform multiple simultaneous comparisons and a rapid selection based on the result of the comparison. The comparison and selection operations typically form a critical path in the instruction path timing of the microprocessor. One technique for maximizing the speed of the instruction timing path is the usage of self-resetting (post-charge) logic. One challenge in the usage of self-resetting logic arises because both the hit signals and the data signals are self-resetting. If the hit signals and data signals are not active simultaneously, an error or failure occurs. In accordance with an embodiment of the present invention, a circuit and operating technique allow a multiplexer to detect both the hit signal and the data signal and, if necessary, delay a signal so that both occur simultaneously.

A handshake signal generating circuit monitors result "match" and "no match" signals from a plurality of dynamic differential comparators and generates an additional signal indicating when none of the result signals match.

In accordance with an aspect of the present invention, the pulse width of timing pulses is controlled to prevent timing glitches in self-resetting circuits.

Many advantages are achieved by the described handshake circuit and operating method. The described circuit and method permit the fast operation of dynamic circuits while providing for accurate timing of dynamic signals. A handshake signal generating circuit advantageously supplies a technique for detecting the absence of a match or "hit" signal.

A differential comparator is advantageously used so that timing information is inherent to the operation of the circuit and timing signals may be omitted, simplifying and reducing the circuitry.

BRIEF DESCRIPTION OF THE DRAWINGS

The features of the described embodiments believed to be novel are specifically set forth in the appended claims. However, embodiments of the invention relating to both structure and method of operation, may best be understood by referring to the following description and accompanying drawings.

DETAILED DESCRIPTION OF THE ILLUSTRATIVE EMBODIMENTS

Figure 1:
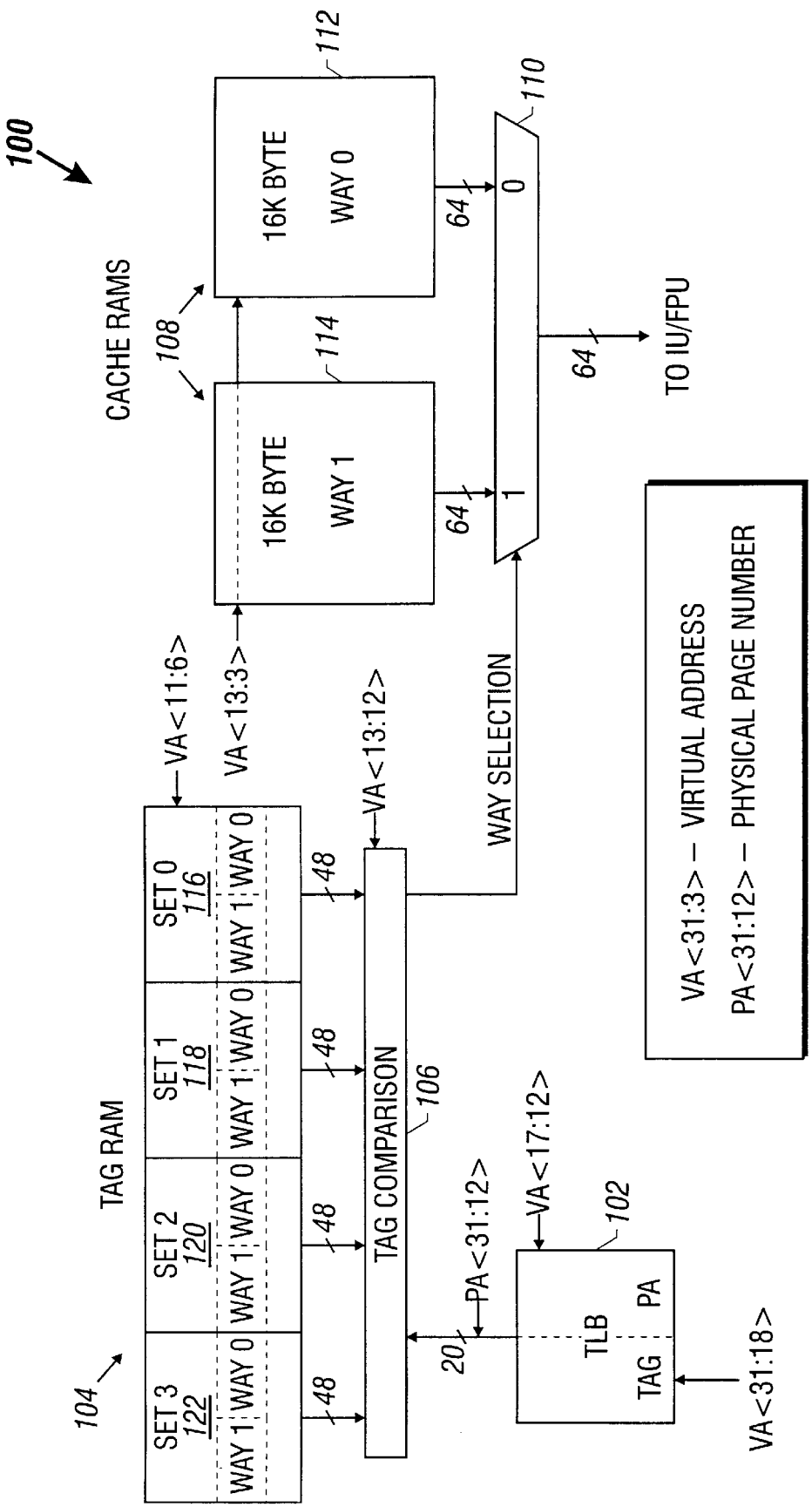
FIG. 1 is a schematic block diagram showing an embodiment of a cache, translation lookaside buffer (TLB), and tag RAM that is suitable for usage in the cache block shown in FIG. 9 hereinafter.

Referring to FIG. 1, a schematic block diagram illustrates an embodiment of a control circuit 100 portion of the cache block 902 (shown in FIG. 9) for implementing cache control of a multiple-way set-associative cache memory using a translational lookaside buffer (TLB) 102. The cache control circuit 100 includes a tag RAM 104, the TLB 102, a tag comparison circuit 106, a cache RAM 108, and a multiplexer 110. The cache RAM 108 includes two ways, way 0 112 and way 1 114. The cache RAM 108 and the TLB 102 each have 256 sets. Each of the 256 sets contains two ways (or lines) and each line contains two sub-blocks so that the total number of bytes is 256×2×64 or 32 KB. Data is read out from the two ways 112 and 112 of the cache RAM 108 and transferred via the multiplexer 110. Both the L1 instruction cache 902 and the data cache 940 (shown in FIG. 9) are 32 KB, virtually-indexed, two-way set-associative caches with a 64 byte-line size and 32 byte sub-blocking. Cache fills are performed on a sub-block basis.

Both the L1 instruction cache 902 and the data cache 940 are virtually indexed with only bits [13:12] of the index address being virtual. Bits [13:6] of the address define the set index of the address. Accordingly, each line resides in one set of a group of four sets with the groups being defined by the different combinations of bits [ 13:12].

The tag RAM 104 performs a read operation in a first half cycle and a write operation in a second half cycle of a processor cycle. Write data is available at the beginning of the first half cycle and is bypassed to read terminals with no read access penalty. The tag RAM 104 in both the L1 instruction cache 902 and the data cache 940 include special modifications for supporting reading of the group of four sets in one cycle. The tag RAM 104 is separated into four sets including set 0 116, set 1 118, set 2 120, and set 3 122. Each of the four sets in the tag RAM 104 include two ways, a way 0 and a way 1. The tag RAM 104 is effectively indexed by address bits [11:6] for read operations and a total of eight tags are read on every access of the tag RAM 104. The tag comparison circuit 106 compares all eight tags to a 20-bit physical address signal on physical address lines pa<31:12> from the TLB 102 to detect virtual index aliasing during tag lookup. When the tag comparison circuit 106 detects an alias, the cache line or sub-block is invalidated or, if dirty, written-back to memory. Then the cache line or sub-block at the address is returned to the cache block 502 and entered into a new set corresponding to the new linear index. In this manner, the TLB 102 disallows creation of aliases by ensuring that a line or sub-block resides in only one of the possible group of four sets.

The tag RAM 104, for example the instruction tag RAM, contains 512 20-bit physical tags. Each tag has two additional bits for status, and each pair of tags share a most-recently-used (MRU) bit. The tag RAM 104 is logically a two-way set-associative memory. The tag comparison circuit 106 has eight sets of tag-TLB comparators (not shown) and eight sets of snoop comparators (not shown). The eight tags corresponding to the four sets 116–122 and two ways per set are read from the tag RAM 104 in each cycle and compared to data from the TLB 102 so that all possible synonyms are checked in a single cycle, optimizing the speed of the cache block 502 at the expense of additional layout complexity and area. In one embodiment, the tags read from the tag RAM 104 include 22 bits and relate the physical address of the upper 20–22 bits of a 32-bit address. The tag comparison circuit 106 compares the 22 bits of the tag with data accessed from the TLB 102 to determine whether the TLB data exists in any of the eight ways of the sets. The tag comparison circuit 106 essentially performs a virtual address to physical address translation. A tag that matches a TLB entry designates that the TLB entry actually exists in the cache and identifies the location of the entry.

The tag comparison circuit 106 operates by performing four comparisons comparing data entries from the TLB 102 with the four tag sets generated by the tag RAM 104 and selecting data designated as a result of the comparisons from the cache. A "hit" signal is allocated for each of the four sets of the tag RAM 104. In any instant at most one of the four hit signals has a "true" level. Often none of the four hit signals takes a "true" value. Of the four hit signals, if one hit signal goes to the "true" level, the true bit selects a corresponding multiplexer 110 of four multiplexers and reads out data from a portion of the cache designated by the true bit. One complication that arises is that no match occurs in many instances. If a match does not occur, then no data is read out from the cache.

The operation of the tag comparison circuit 106 and the multiplexer 110, involving multiple simultaneous comparisons and a rapid selection in response to the comparison, is typically a critical path in the instruction path timing of the microprocessor 900. One technique for maximizing the speed of the instruction timing path is the usage of dynamic logic such as self-resetting logic, post-charge logic, modified delayed-reset logic, and the like. Unfortunately, both the hit signals and the data signals are self-resetting. If the hit signals and data signals are not active simultaneously, an error or failure occurs.

The tag comparison circuit 106 and multiplexer 110 described hereinafter solve the problem of accurately timing self-resetting circuits in the critical timing path by including circuits that allow the multiplexer 110 to detect both the hit signal and the data signal and, if necessary, delay a signal so that both occur simultaneously.

Figure 2A:
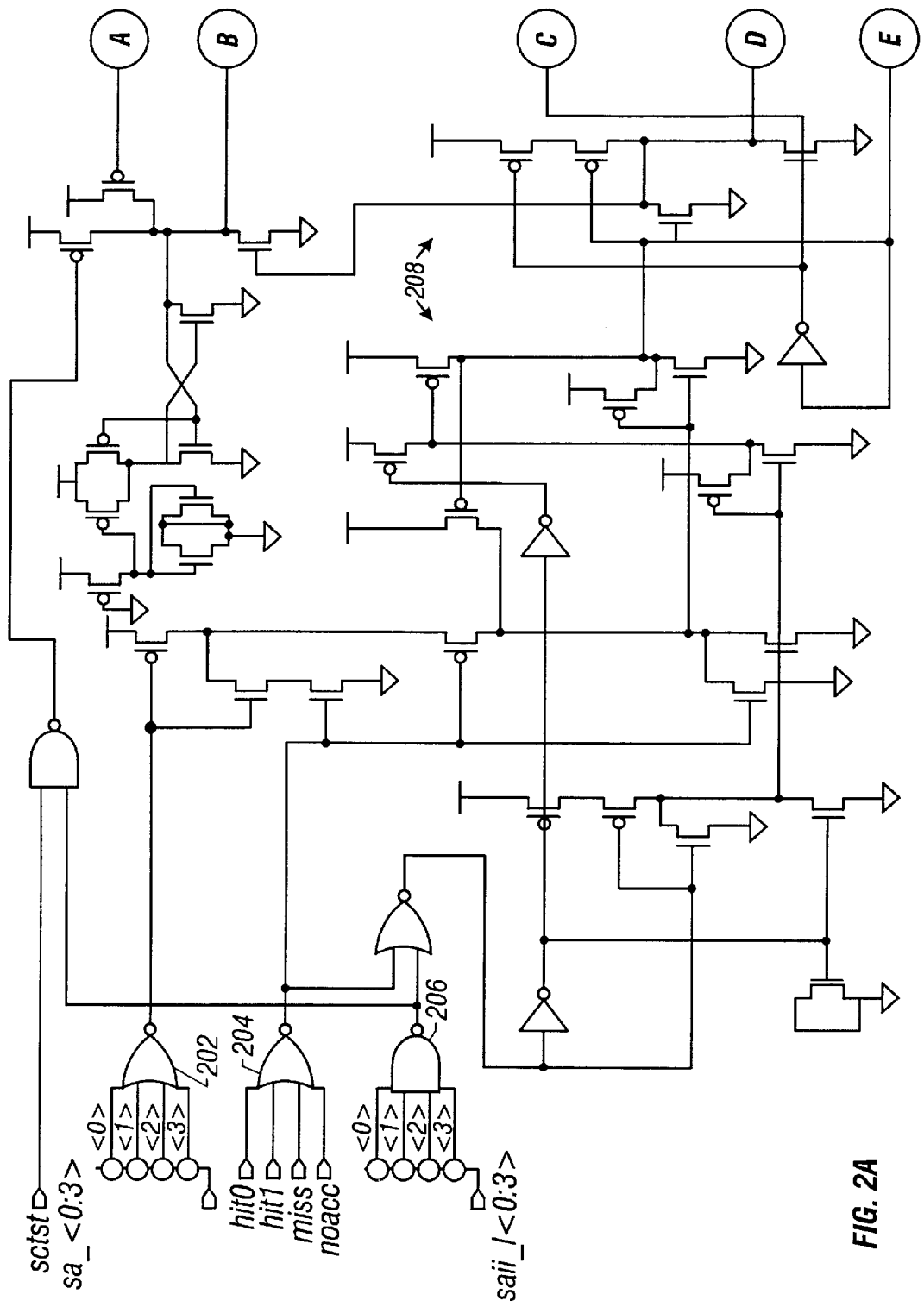
FIG. 2 is a schematic circuit diagram showing an embodiment of a suitable circuit for generating handshake signals for self-resetting circuits.
Figure 2B:
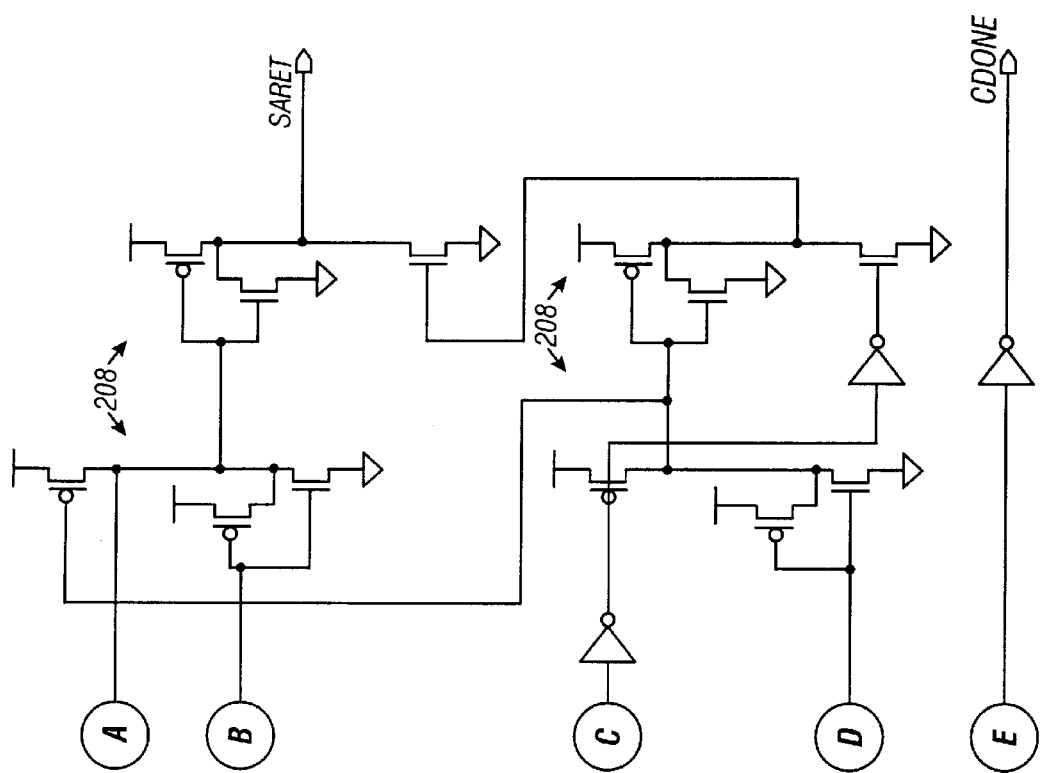

The tag RAM 104 includes circuits shown hereinafter in FIG. 2 implementing self-resetting circuit techniques and achieves a simulated access time of 1.7 ns (excluding operation of the comparators) driving a load of 1 pf Referring to FIG. 2, a schematic circuit diagram shows an embodiment of a suitable circuit 200 for generating handshake signals for self-resetting circuits. The handshake signal generating circuit 200 forms a timing interface between the instruction cache 902 shown in FIG. 9, and the tag RAM 104 and TLB 102 shown in FIG. 1. The handshake signal generating circuit 200 is a dynamic circuit to increase the gain of the timing signals to drive a large load. The handshake signal generating circuit 200 includes a NOR gate 202 that receives a plurality of cache data signals from the instruction cache 902 and a NAND gate 206 that receives the complement of the cache data signals. The NOR gate 202 and the NAND gate 204 are connected to the output terminal of a sense amplifier strobe (not shown) that activates a sense amplifier (not shown) of the instruction cache 902 to reset the sense amplifier strobe. The handshake signal generating circuit 200 also includes a NOR gate 206 that receives a plurality of tag data signals from the tag RAM 104 through the tag comparison circuit 106. The tag data signals indicate the occurrence of a match or "hit" between tags in the tag RAM 104 and data in the TLB 102. The handshake signal generating circuit 200 also includes a plurality of buffers 208 or dynamic drivers for buffering loads and setting selected delay times to generate a CDONE signal 310 and a cycle reset signal 318 which are described in detail in the discussion of FIG. 3.

Figure 3:
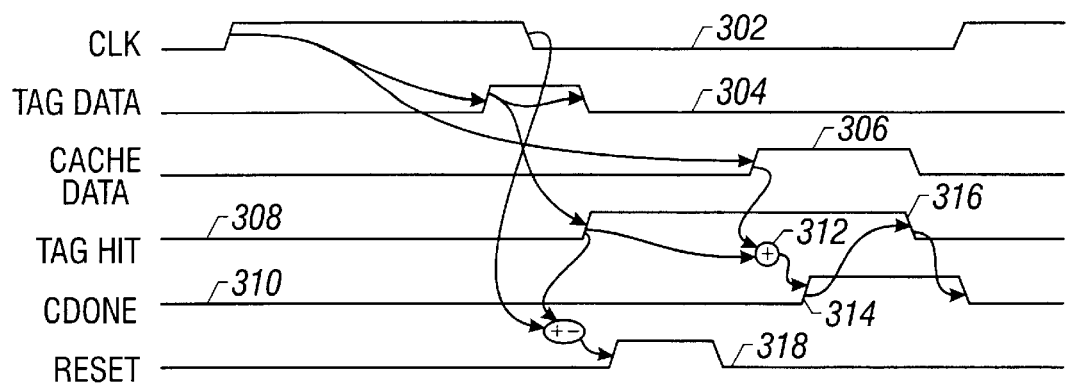
FIG. 3 is a timing diagram illustrating an example of a timing cycle of the handshake signals for self-resetting circuits.

Referring to FIG. 3, a timing diagram illustrates an example of a timing cycle of the handshake signals for self-resetting circuits. The microprocessor 900 is timed by a periodic clock signal 302. In addition to initiation of a read access, the leading edge of a clock signal 302 initiates derivation of the tag data signal 304, a cache data signal 306, and a TLB data signal (not shown). The cache data signal 306 intrinsically has a greater delay than the tag data signal 304 due to a larger memory size, and thus a longer access time, of the instruction cache 902 in comparison to the tag RAM 104. A tag hit signal 308 occurs after the tag data signal 304 becomes active upon detection of a tag hit by the tag comparison circuit 106 and takes place in the time difference of the cache access time and the tag access time.

Signals such as the tag data signal 304 and the cache data signal 306 are to be reset prior to a subsequent read access to precharge the cache and tag data paths. In addition, a precharge cycle is to be applied to the various blocks of the instruction cache 902 subsequent to the read access. Instead of using a postcharge pulse to reset signals such as the tag data signal 304 and the cache data signal 306, the signals are reset by the handshake signal generating circuit 200.

Theoretically, an error could occur if the tag data signal 304 is reset too early and the cache sense amplifier data is not ready. Any error is avoided if the tag data signal 304 is reset only after the cache data signal 306 has become valid and the multiplexer 110 has properly used the combination of data and hit signal to select the read data from the instruction cache 902. The handshake signal generating circuit 200 generates a handshake signal, named a cache completion (CDONE) signal 310 that designates when resetting of the tag data signal 304 and the TLB data signal is appropriate. The handshake signal generating circuit 200 generates the CDONE signal 310 triggered by the simultaneous occurrence 312 of two signals, the cache data signal 306 and the tag hit signal 308. The handshake signal generating circuit 200 generates the leading edge 314 of the CDONE signal 310 a selected suitable delay time after both the cache data signal 306 and the tag hit signal 308 are asserted. The handshake signal generating circuit 200 then applies the leading edge 314 of the CDONE signal 310 to reset the tag hit signal 308 after a predetermine suitable delay time. The handshake signal generating circuit 200 completes the handshake operation by triggering reset of the CDONE signal 310 signal upon the occurrence of the falling edge 316 of the tag hit signal 308. The cache data signal 306 signal is reset with the leading edge of the tag hit signal 308 after a selected suitable delay since some amount of time elapses in resetting of the cache data signal 306. After a data access and after the CDONE signal 310 is sent back from the cache, the tag data signal 304 initiates a reset of the sense amplifiers for both the tag RAM 104 and the instruction cache 902

One marked difference between the operation of the handshake signal generating circuit 200 and conventional timing circuits is that conventional timing circuits typically use both true data and complement data signals as trigger signals for subsequent timing signals. In the conventional circuits either a true condition or a complement condition must occur so that completion of a timing cycle always takes place. For the case of comparing the tags in the tag RAM 104 and the data in the TLB 102, true data and complement data are not always available. The tag comparison circuit 106 generates four hit signals, at most one of which may be active at one time. In many conditions, no matches occur since requested data does not reside in the instruction cache 902. A signal is inherently generated that indicates a "miss", the condition of a hit not occurring in any of the four sets or the condition that no compare took place. Unfortunately, no signal is inherently generated indicating a tag "no access" condition. The tag "no access" is controlled by a clock negative edge. The handshake signal generating circuit 200 therefore generates a cycle reset signal 318, to designate the "miss" condition. The handshake signal generating circuit 200 generates the cycle reset signal 318 upon triggering by the falling edge of the clock signal 302 in combination with the rising edge of the tag hit signal 308 after a predetermined delay. The cycle reset signal 318 designates the absence of a tag hit signal 308 during the time the clock signal 302 is asserted, specifically the lack of a tag hit signal 308 at the falling edge of the clock signal 302. The handshake signal generating circuit 200 sends the cycle reset signal 318 to the instruction cache 902 to terminate the last cycle and reset for a subsequent cycle.

The function of determining a "hit" or "no compare" condition for a dynamic comparator is a challenge since the internal nodes are dynamic and pulses exist for only a finite pulse width. A data match that indicates a "hit" is difficult to sense since no signal is applied to the match line. A suitable technique for sensing the "hit" condition is to supply a dummy signal to pull off the 1match line at half the timing cycle rate. A first and second signal are compared. If the first signal is reset before the second signal is asserted, no match can possibly be detected.

Other solutions, such as waiting for the falling edge of a delayed tag data signal and polling the tag hit signals to determine if any had been asserted, are unsatisfactory since polling the tag hit signals with an OR-type structure is typically a slow operation.

Figure 4:
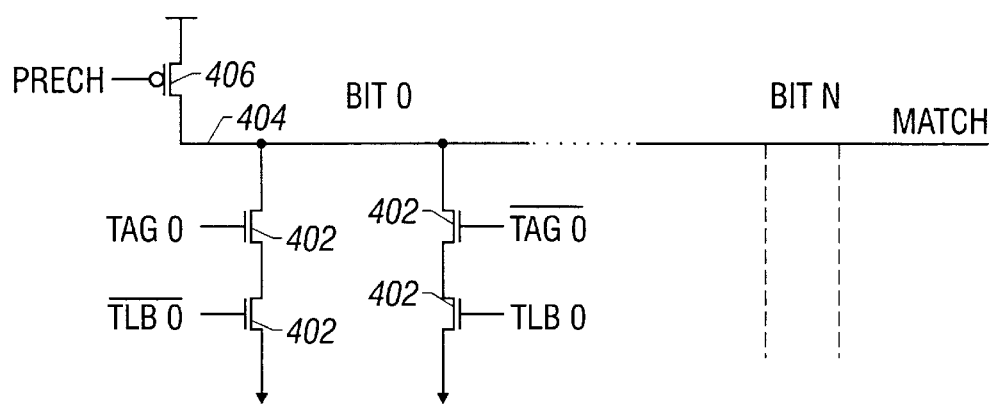
FIG. 4 is a schematic circuit diagram depicting a comparator structure for determining a match or mismatch condition of tag data and the translational lookaside buffer (TLB).

Referring to FIG. 4, a schematic circuit diagram depicts a comparator structure for determining a match or mismatch condition of tag data and the translational lookaside buffer (TLB). The comparator structure 400 includes two pairs of series-connected n-channel MOSFETs 402 for each compared bit with the n-channel MOSFETs 402 for all bits connected to a match line 404. A pair of series-connected n-channel MOSFETs 402 performs an exclusive-NOR function. The match line 404 is connected to a precharge switch 406, illustratively a p-channel MOSFET controlled by a precharge line. The comparator structure 400 for comparing bit 0 is shown. One pair of series-connected n-channel MOSFETs 402 for the bit 0 comparison includes transistors controlled by a TAG DATA data bit 0 and a TLB data bit 0 bar. The second pair of series-connected n-channel MOSFETs 402 for the bit 0 comparison includes transistors controlled by a TAG DATA data bit 0 bar and a TLB data bit 0.

The match line 404 is precharged high prior to a comparison. A mismatch occurs for any bit if TAG DATA and TLB data bar are equal or TAG DATA bar and TLB data are equal so that the series pair is activated and discharges the match line 404. Thus if any one bit position mismatches, one path would discharge the match line 404 and indicate a "no match" condition. If all match, then no signal is generated. The absence of a dynamic signal is very difficult to detect since one compared signal may be reset before the other is asserted.

The handshake signal generating circuit 200 advantageously supplies a technique for detecting the absence of a match or "hit" signal.

Figure 5A:
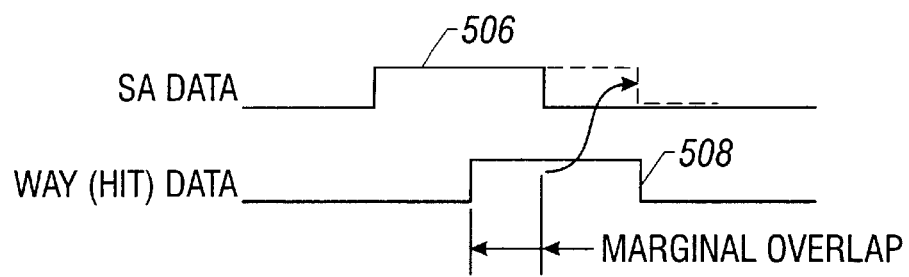
FIGS. 5A and 5B are timing diagrams illustrating an example of a technique for overlapping handshake signals using the handshake signal generating circuit.
Figure 5B:
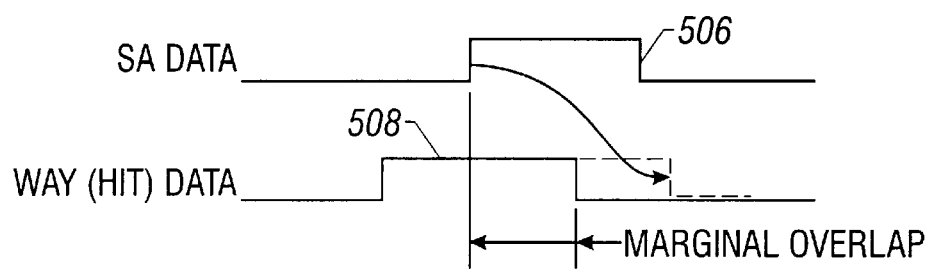

Referring to FIGS. 5A and 5B, a timing diagram illustrates an example of a technique for overlapping handshake signals using the handshake signal generating circuit 200. In FIG. 5A, the instruction cache 902 sends data, producing a cache data signal 506, and the tag hit signal 508 is sent prior or subsequent to the cache data signal 506. The handshake signal generating circuit 200 performs timing and signaling operations to produce a margined overlap between the cache data signal 506 and the tag hit signal 508 with a suitable margin to prevent failure. The marginal overlap is produced if the cache and the tag RAM are reset internally using self-resetting or post-charged logic. In particular, the handshake signal generating circuit 200 increases the overlap of the signals by extending the time interval that the cache data signal 306 is asserted.

Figure 5C:
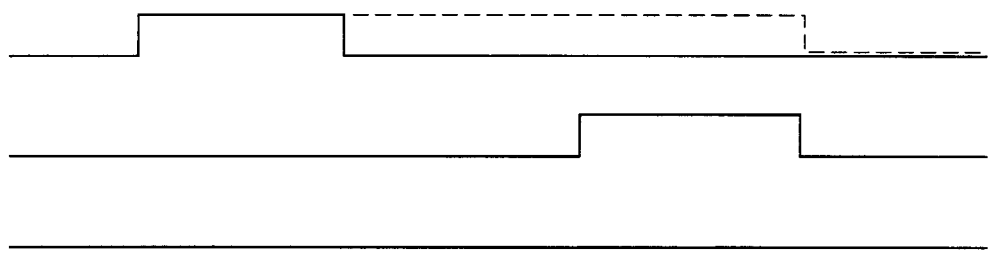
FIG. 5C is a timing diagram that shows the overlapping handshake signals.

In FIG. 5B, the tag hit signal 508 precedes the cache data signal 506. The handshake signal generating circuit 200 extends an overlap period 510 by delaying the reset of the tag hit signal 508 as shown in FIG. 5C. Other than the generation of handshake signals by the handshake signal generating circuit 200, the tag hit signal 508 and the cache data signal 506 are completely independent and disjoint.

Figure 6:
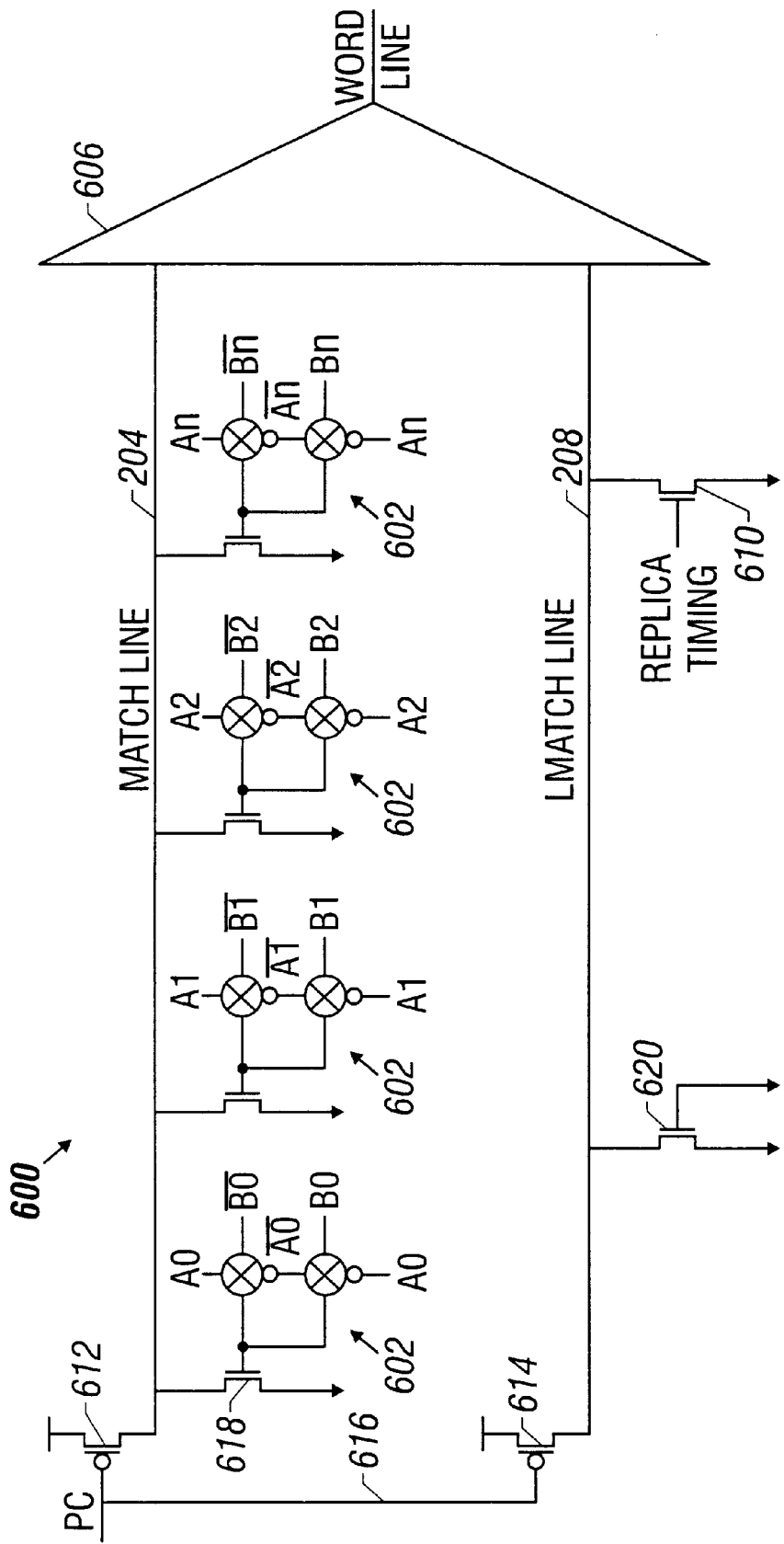
FIG. 6 is a schematic mixed circuit and block diagram showing an embodiment of a differential comparator that is used in applications such as the cache.
Figure 9:
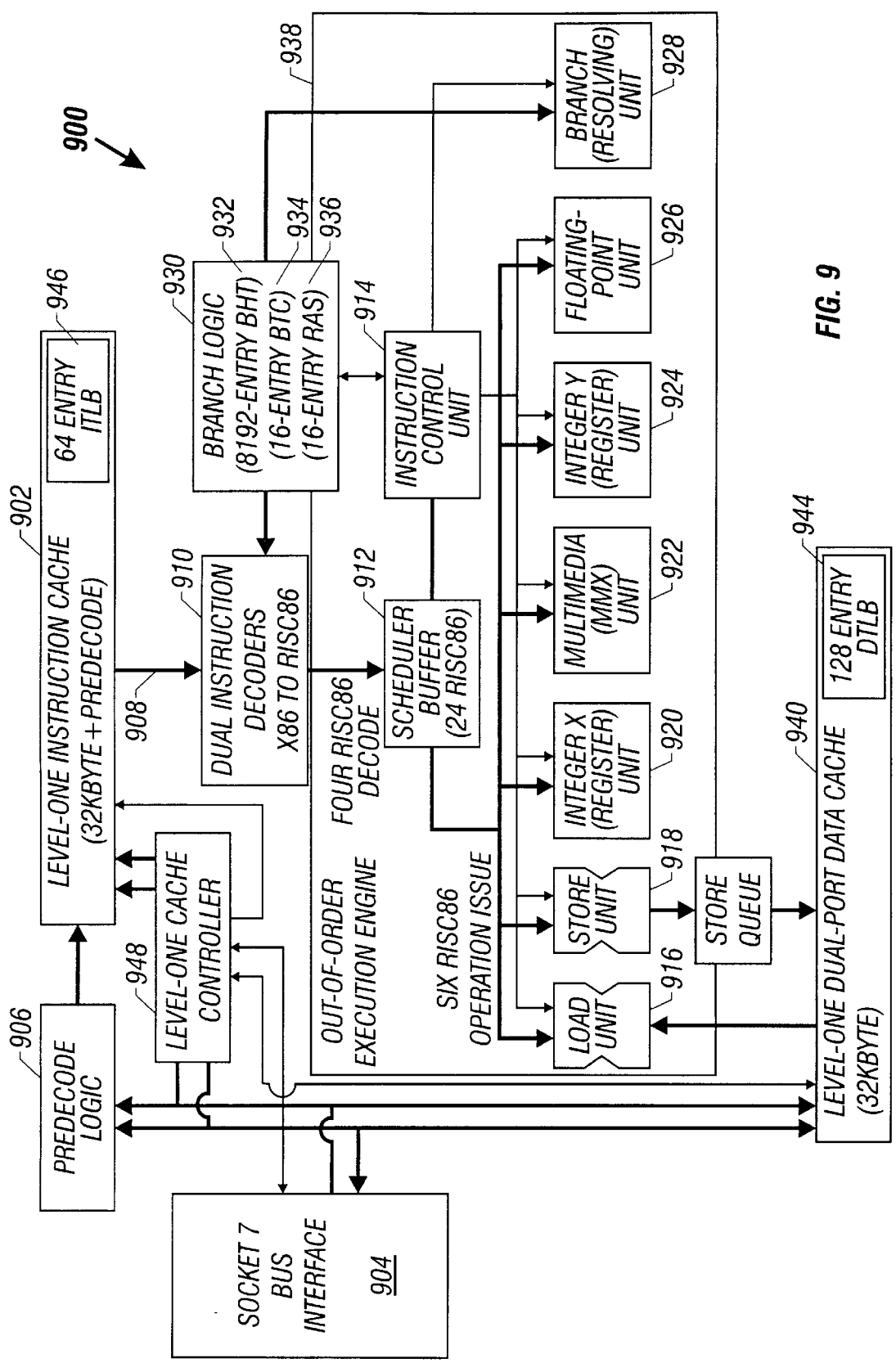
FIG. 9 is an architectural block diagram which illustrates an embodiment of a microprocessor in accordance with an embodiment of the present invention.

Referring to FIG. 6, a schematic mixed circuit and block diagram of an embodiment of a differential comparator 600 that is used in applications such as the AND array of the programmable logic array (PLA) shown in FIG. 9. The differential comparator 600 is an array row that includes a plurality of exclusive-OR array elements 602 connected to a match line 604. The match line 604 is connected to a plus input terminal of a differential amplifier 606. The minus terminal of the differential amplifier 606 is connected to an 1match line 608. A replica timing transistor 610 is connected to the 1match line 608. The match line 604 and the 1match line 608 are precharged through the operation of respective match and 1match precharge switches 612 and 614 that are controlled by a precharge signal PC.

The match line 604 and the 1match line 608 are simultaneously precharged to a high state when activated by precharge line 616 under control of the precharge switches 612 and 614. The plurality of exclusive-OR array elements 602 on the match line 604 are used to compare a first sequence of bits to a second sequence of bits. For example, the exclusive-OR array elements 602 are used in the present example to compare two buses including bits An through A0 and Bn through B0, respectively. Bits An_bar through A0_bar and Bn_bar through B0_bar are generated and applied to the exclusive-OR array elements 602 in combination with the An-A0 and Bn-B0 bits.

For the differential comparator 600, which is a dynamic-type comparator, the address bits are monotonic, starting in a low state and making a transition to a high state to achieve a fast operating speed. For example, bit A0 and inverted bit A0_bar and bit B0 and inverted bit B0_bar are applied to an exclusive-OR array element 602. In one embodiment, the exclusive-OR array element 602 includes a single N-channel MOSFET pulldown transistor 618 that is driven by a pair of transmission gates for comparing bit A0 and B0. If bit A0 is not equal to bit B0, indicating a no-match condition, the exclusive-OR array element 602 activates an n-channel MOSFET 618 to discharge the match line 604. A balance transistor 620 is connected to the 1match line 608 to balance the capacitance of the exclusive-OR array elements 602 on the match line 604. The replica timing transistor 610 is connected to the 1match line 608 and is activated by a replica timing signal that replicates the timing of the address signals. The exclusive-OR array elements 602 have a width W and the replica timing transistor 610 has a width W/2 that is half the width of the exclusive-OR array elements 602.

When the address signals are applied to the exclusive-OR array elements 602, if one or more bits do not match, the corresponding exclusive-OR array elements 602 discharge the match line 604. The differential amplifier 606 detects the discharged match line 604 and generates a "miss" signal. When all of the bits match, the match line 604 is precharged to a high state and remains high. To assure that a "hit" signal is generated when all of the bits match, the replica timing transistor 610 discharges the 1match line 608. Thus when the 1match line 608 is discharged while the match line 604 remains charged, the differential amplifier 606 generates a "hit" signal that is distinguished from simply the lack of a miss condition.

An advantage of the differential comparator 600 is that timing information is inherent to the operation of the circuit so that timing signals may be omitted, simplifying and reducing the circuitry in the differential comparator 600. In some cases the differential sensing without tiring is faster than a timed circuit since a decision is made when the differential signals change sufficiently for the differential sense amplifier 602 to detect the variation, rather than upon a full rail signal change. This aspect of differential sensing is further advantageous due to the large number of array elements 602 connected to the match line 604 and thus the large fan-out that slows signals on the match line 604. Since less than a full-rail signal change is sensed by the differential sense amplifier 602, the speed of the differential comparator 600 is increased.

Figure 7:
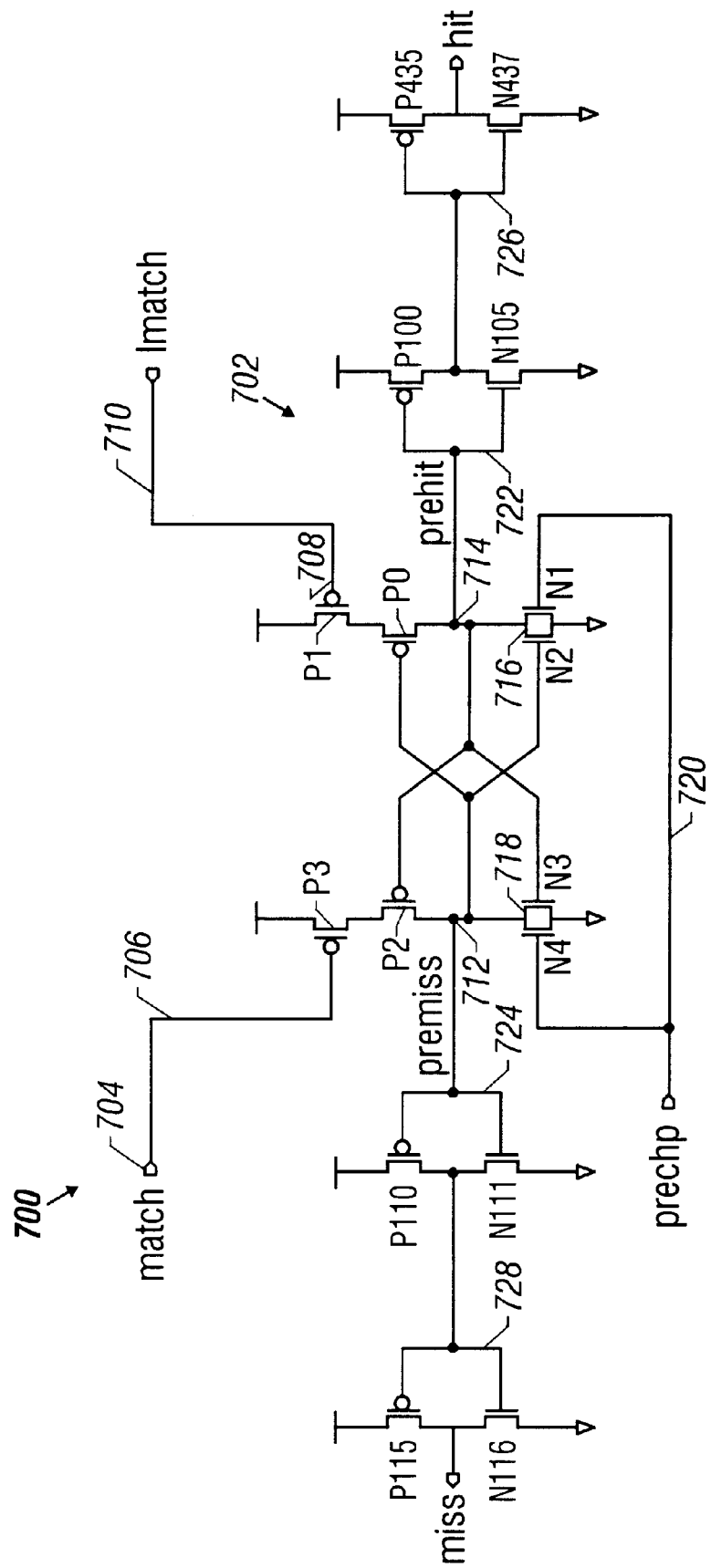
FIG. 7 is a schematic circuit diagram illustrating an embodiment of a differential amplifier for usage in the differential comparator.

Referring to FIG. 7, a schematic circuit diagram illustrates an embodiment of a differential amplifier 702 for usage in the differential comparator 700. The differential amplifier 702 is self-timed, timed without use of a strobe signal, simplifying the structure of the circuit. The differential amplifier 702 has a symmetric, current mirror form while including structures that avoid the need for a bias current. Typical current mirror structures require biasing so that the illustrative differential amplifier 702 advantageously saves power.

The differential amplifier 702 includes a "true" input terminal 704 connected to a match line 706 and a "complement" input terminal 708 connected to an 1match line 710. The true input terminal 704 is formed by a true input p-channel MOSFET p3 having a gate connected to the match line 704. The true input p-channel MOSFET p3 is connected to a current mirror p-channel MOSFET p2, forming a source-drain pathway from a power source VDD to a premiss node 712. The complement input terminal 708 is formed by a complement input p-channel MOSFET p1 having a gate connected to the 1match line 706. The complement input p-channel MOSFET p1 is connected to a current mirror p-channel MOSFET p0, forming a source-drain pathway from a power source VDD to a prehit node 714. The gate of the current mirror p-channel MOSFET p2 is connected to the prehit node 714. The gate of the current mirror p-channel MOSFET p0 is connected to the premiss node 712. The differential amplifier 702 also includes a current mirror n-channel MOSFET n3 and a current mirror n-channel MOSFET n2. The current mirror n-channel MOSFET n3 has a source-drain pathway between the premiss node 712 and a ground reference VSS, and has a gate connected to the prehit node 714. The current mirror n-channel MOSFET n2 has a source-drain pathway connected between the prehit node 714 and the ground reference VSS, and has a gate connected to the premiss node 712. The current mirror n-channel MOSFETs n2 and n3 are sized to a sufficiently large channel width to prevent common-mode operation errors that result when the voltage level of the match line 704 and 1match line 706 signals are discharged simultaneously, coupling both the premiss node 712 and the prehit node 714 to a low state so that both complement input p-channel MOSFET p1 and true input p-channel MOSFET p3 are active simultaneously.

The differential amplifier 702 includes a pair of precharge terminals 716 and 718 for precharging the prehit node 714 and the premiss node 712. The precharge terminal 716 is formed by a precharge n-channel MOSFET n4 having a source-drain pathway connected between the premiss node 712 and the ground reference VSS, and having a gate connected to a precharge line 720. The precharge terminal 718 is formed by a precharge n-channel MOSFET n1 having a source-drain pathway connected between the prehit node 714 and the ground reference VSS, and has a gate terminal connected to the precharge line 720.

A buffer 722 is connected to the prehit node 714 and a buffer 724 is connected to the premiss node 712 to first buffer stage. Both the buffer 722 and the buffer 724 are CMOS logic inverters having a low input impedance in both high and low states, and having no quiescent current. In the illustrative embodiment, a drive buffer 726 is connected to the buffer 722 and a drive buffer 728 is connected to the buffer 724 to form a second buffer stage. The drive buffer 726 and drive buffer 728 are outside stages of the differential comparator 700 that buffer the prehit node 714 and the premiss node 712, respectively, to drive larger loads (not shown). In other embodiments, the second buffer stage or both buffer stages may be omitted or include components that are not inverters, such as logic gates. For any buffer stage configuration, the capacitance at the prehit node 714 and the premiss node 712 are specified to be substantially equal no matter what loads are driven by the nodes.

Figure 8:
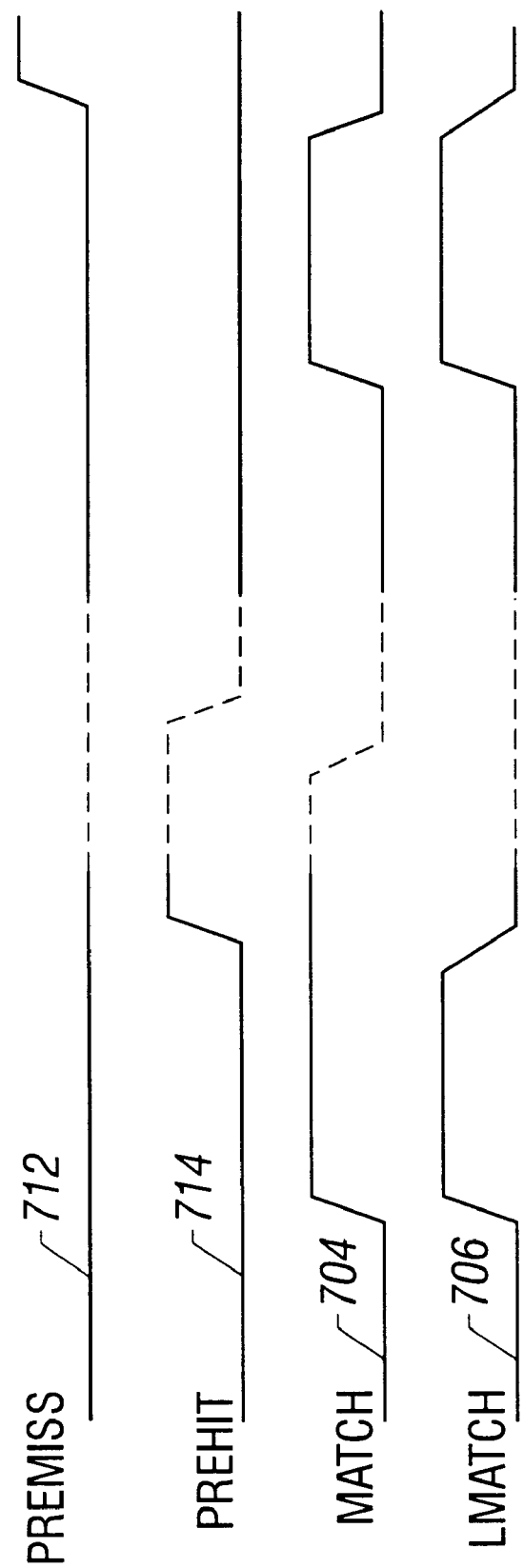
FIG. 8 is a timing diagram illustrating operation of the differential comparator shown in FIG. 7.

Referring to FIG. 8 in conjunction with FIG. 7, a timing diagram illustrates operation of the differential comparator 700. In a quiescent state, a precharge signal on the precharge line 720 has previously passed through an "ON" or "high" state, then through an "OFF" or "low" state so that the premiss node 712 and the prehit node 714 are both discharged to ground (VSS). The ground (VSS) potential is applied to the gates of current mirror p-channel MOSFETs p0 and p2 so that both are activated to an ON state. Both the match line 704 and the 1match line 706 are precharged to an ON or high state so that the high state applied to the gates of complement input p-channel MOSFET p1 and true input p-channel MOSFET p3 so that both are deactivated to an OFF state. The deactivation of complement input p-channel MOSFET p1 and true input p-channel MOSFET p3 advantageously stops bias current in the differential amplifier 702.

Activation of address input signals to exclusive-OR circuit 602 shown in FIG. 6 causes the 1match line 706 to fall from a high state to a low state as a result of the replica timing that generates pulses every timing cycle. The replica timing activates the half-size replica timing device 602 so that the signal on the 1match line 706 falls from the high state to the low state with a fixed delay. The match signal on the match line 704 remains in the high state if a match condition occurs but is discharged at least twice as fast as the 1match signal on the 1match line 706 because the match line 704 is loaded by a full-size device. In addition the match line 704 is connected to multiple full-size devices and potentially loaded by each. Every bit that mismatches adds to the load on the match line 704, increasing the rate of discharge of the match line 704. If only a single bit mismatches, the match line 704 discharges slowest, at a rate approximately twice the discharge rate of the 1match line 706. If all bits mismatch, the match line 704 typically discharges immediately to ground (VSS).

The differential comparator 700 detects whether the signal on the match line 704 or the signal on the 1match line 706 falls more rapidly. The first signal that falls a p-channel MOSFET threshold below the power source VDD activates either true input p-channel MOSFET p3 if match line 704 falls first or complement input p-channel MOSFET p1, otherwise. In either case, current mirror p-channel MOSFET p0 and current mirror p-channel MOSFET p2 are precharged to an ON state when the p-channel MOSFET p1 or p3 are activated.

In the case that the signal on 1match line 706 is discharged while the signal on match line 704 remains in the high state, complement input p-channel MOSFET p1 is activated so that current flows to the prehit node 714, thereby charging the prehit node 714. Charging of the prehit node 714 deactivates current mirror p-channel MOSFET p2 to an OFF state while activating current mirror n-channel MOSFET n3 to an ON state. The activation of current mirror n-channel MOSFET n3 to an ON state holds the premiss node 712 to the low state, preventing charging resulting from coupling currents in the differential amplifier 702.

Current mirror p-channel MOSFET p0 and current mirror p-channel MOSFET p2 are highly useful in the case that both match line 704 and 1match line 706 are discharged. If the signal on the match line 704 is discharged, the discharge is more rapid than the discharge of the signal on 1match line 706 so that true input p-channel MOSFET p3 is activated prior to complement input p-channel MOSFET p1. True input p-channel MOSFET p3 is activated to the ON state, charging the premiss node 712. The premiss node 712 charges and deactivates current mirror p-channel MOSFET p0 to an OFF state. The signal on the 1match line 706 also discharges, but discharges slowly in comparison to the match line 704 signal so that current mirror p-channel MOSFET p0 is deactivated to the OFF state by the time the 1match line 706 signal reaches a p-channel MOSFET threshold below power source VDD. Although the signal on the 1match line 706 is discharged to ground (VSS), the differential amplifier 702 is committed to charging the premiss node 712 to the high state and discharging the prehit node 714 to the low state.

The differential amplifier 702 is regenerative. The signals on the match line 704 or the 1match line 706 may make only partial transitions and the differential comparator 700 will switch states. Once the differential amplifier 702 is committed, the state of the differential comparator 700 is latched until the precharge signal on the precharge line 720 is raised to a high state.

The differential comparator 700 is advantageously self-timed. The differential comparator 700 responds to the voltage differential applied to the match line 704 and 1match line 706 without invoking an external timing signal to activate the differential comparator 700.

In the illustrative embodiment of the differential amplifier 702, complement input p-channel MOSFET p1, true input p-channel MOSFET p3, current mirror p-channel MOSFET p0, and current mirror p-channel MOSFET p2 are preferably reasonably well-matched although the differential amplifier 702 is tolerant to a large amount of mismatch and remains operational. For example in the case that the signals on both match line 704 and 1match line 706 are discharged, when the match line 704 signal reaches a p-channel threshold voltage ($V_{tp}$) less than power source VDD, the signal on 1match line 706 has reached only half the voltage difference. If $V_{tp}$ is 400 mV, the differential amplifier 702 has 200 mV of signal margin so that a fairly inaccurate transistor matching is possible.

In an alternative embodiment of the differential amplifier 702, complement input p-channel MOSFET p1 is transposed with current mirror p-channel MOSFET p0 so that complement input p-channel MOSFET p1 is connected to the prehit node 714. Likewise, true input p-channel MOSFET p3 is transposed with current mirror p-channel MOSFET p2 so that true input p-channel MOSFET p3 is connected to the premiss node 712. Performance is slightly different in the alternative embodiment of the differential amplifier 702 with a small increase in switching speed but a slight sacrifice in sensitivity.

In the alternative embodiment, like the embodiment depicted in FIG. 7, the p-channel transistor pair, complement input p-channel MOSFET p1 and current mirror p-channel MOSFET p0, and the transistor pair, true input p-channel MOSFET p3 and current mirror p-channel MOSFET p2, are connected in series with cross-coupling between the pairs so that one pair is deactivated to an OFF state when the other pair is activated to an ON state.

Referring to FIG. 9, a schematic block diagram illustrates an embodiment of an AMD-K6 microprocessor 900. The microprocessor 900 is an X86 instruction set-compatible microprocessor implementing a set of Multi-Media eXtenstions (MMX). A level-one (L1) instruction cache 902 begins predecoding instructions obtained from a processor system bus interface 904 during filling of the 32 KB two-way associative L1 instruction cache 902. The L1 instruction cache 902 includes a 64-entry instruction translational lookaside buffer (ITLB) 946. Bypass (not shown) and storage buffers (not shown) for instructions (4×16) and predecode (4×20) to the L1 instruction cache 902 are supplied to allow data-in and data flow-back to cache output terminals.

In the L1 instruction cache 902, aliases are handled during cache line fills without penalty. The occurrence of an alias merely results in the invalidation of the appropriate cache line. In the L1 data cache 940, aliases for both read operations and write operations are handled by performing a state sequence that prevents disturbance from internal or external snoops while the lines are in process of eviction from the cache into a 4×64-bit write eviction buffer or write-back buffer (not shown). If an aliased line is dirty, the L1 instruction cache 902 performs a write back operation after the eviction into the write-back buffer. Once the alias is eliminated, the line is returned to the cache and deposited into a new set at a location corresponding to the new linear index.

The L1 instruction cache 902 uses a Most Recently Used (MRU) prediction technique to predict the way selection on cache accesses. A misprediction in the way selection results in a penalty of one cycle. The L1 instruction cache 902 line replacement algorithm is Least Recently Used (LRU) although an alternative random replacement algorithm is supported using an SR5.ICERLR configuration bit. The L1 instruction cache 902 also supports a direct-mapped replacement algorithm, reducing the cache size from 32 KB to 16 KB, using an SR5.ICDM configuration bit.

The L1 instruction cache 902 performs a simple prefetching algorithm. When a line miss occurs, as distinguished from a sub-block miss, and the miss occurs on sub-block 0 of the line (bit[5] of the address is 0), then both sub-blocks are fetched and pipelined on the bus.

Predecode bits resolved during the predecoding operation are stored in a 20 KB predecode cache (not shown). Predecode logic 906 includes a first stage of instruction decode logic. Data from the L1 instruction cache 902 are fetched by fetch logic 908 and transferred to dual instruction decoders 910. The dual instruction decoders 910 decodes up to two X86 instructions per clock and translates most instructions through a direct hardware decode operation into from one to four RISC-like operations, called RISC86 Ops. The hardware-decoded instructions are generally simple and common-type instructions. Other complex or uncommon instructions are mapped into ROM-resident sequences of RISC Ops using emulation code ROM translation.

Decoded instructions from the dual instruction decoders 910 are transferred to a RISC86 Op Scheduler and buffer 912. The RISC86 Op Scheduler 912 holds up to 24 RISC Ops and stores a total of 48 registers using register renaming. The RISC86 Op Scheduler 912, under control of an instruction control unit 914, issues up to six RISC86 Operations using out-of-order issuing to seven parallel execution units. The execution units speculatively execute the RISC86 Ops to generate results. The RISC86 Op Scheduler 912 retires the results in-order. The execution units include a load unit 916, a store unit 918, an integer X register unit 920, a Multi-Media eXtension (MMX) unit 922, an integer Y register unit 924, a floating-point unit (FPU) 926, and a branch resolving unit 928. A branch logic unit 930 implements a branch prediction operation that uses two-level branch prediction based on an 8192-entry Branch History Table (BHT) 932, a 16-entry Branch Target Cache (BTC) 934, and a 16-entry Return Address Stack (RAS) 936.

The dual instruction decoders 910 translate X86 instructions on-the-fly into corresponding RISC86 Ops. The RISC86 Ops are executed by an instruction core 938 that is essentially a RISC superscalar processing engine. The fetch logic 908 fetches up to sixteen instruction bytes each cycle from the L1 instruction cache 902 and transfers the instruction bytes into an instruction buffer (not shown) preceding the dual instruction decoders 910 so that the instruction buffer is maintained at capacity. The dual instruction decoders 910 accesses the instruction bytes from the instruction buffer, decodes up to two X86 instructions, immediately recognizes and predicts branches, and generates up to four RISC86 Ops. The RISC86 Ops are loaded into the unified RISC86 Op Scheduler 912. The RISC86 Op Scheduler 912 controls and tracks multiple aspects of RISC86 Op issue and execution.

Each cycle up to six RISC86 Ops are issued and executed in a pipelined manner. The six RISC86 Ops may include one memory read operation, one memory write operation, two integer and/or one multi-media register operation, one floating point operation, and one evaluation of a branch condition. The RISC86 Ops are executed out-of-order and are executed subject principally to actual dependencies and resource constraints. One example of a resource constraint is that a maximum of two integer register operations (RegOps) is executed per cycle. Once execution of the RISC86 Ops is complete, the RISC86 Op Scheduler 912, functioning as a reorder buffer, commits the RISC86 Ops in-order to ensure precise exception handling and full operational compatibility with X86 architecture standards. The RISC86 Op Scheduler 912 performs implicit register renaming based upon position within the scheduler buffer (queue) rather than explicit tag assignments that are conventionally employed in systems that use a reorder buffer. The position-based register renaming reduces the size of renaming hardware. The RISC86 Op Scheduler 912 has a first-in-first-out (FIFO) buffer physical structure and performs implicit register renaming, characteristics which, in combination, advantageously permit the use of fast position-based instruction issue and dependency-tracking logic. The dependency-tracking logic has characteristics of many fast adder circuits in which the process of searching for a particular operand is similar to the arithmetic operation of propagating a carry through an adder.

The load unit 916 loads data via a level-one (L1) dual-port data cache 940 which receives data from an external memory (not shown) via the processor system bus interface 904. Bypass (not shown) and storage buffers (not shown) for data (4×16) to the data cache 940 are supplied to allow data-in and data flow-back to cache output terminals.

The data cache 940 includes a 128-entry data translational lookahead buffer (DTLB) 944. The data cache 940 is a 2-way set-associative, 32 KB size cache with a 64 byte line-size and 32-byte sub-blocking. The data cache 940 fills on the basis of the 32-byte sub-block units. In contrast to the L1 instruction cache 902, the data cache 940 uses a Least Recently Missed (LRM) selection technique which is generally a more accurate way selection scheme than the LRU technique of the L1 instruction cache 902. In the LRM scheme, the line that first enters the cache is replaced. An alternative random replacement algorithm is supported and activated through usage of a SR5.DCERLR configuration bit. The data cache 940 also supports a direct-mapped replacement algorithm, reducing the cache size from 32 KB to 16 KB, using an SR5.DCDM configuration bit.

The data cache 940 supports write allocation, which is disabled by setting an SR5.WAD configuration bit. Write allocation is allowed when caching is enabled through miscellaneous cache enable/disable bits and either of two conditions is true. A first condition is that a write operation hits on a line but misses on the requested sub-block. The second condition is that a write operation missed on a line but hit on a one-page cacheability control register used specifically on write-allocate operations. The cacheability control register is invalidated during RESET, translation lookahead buffer invalidations, or cache invalidations initiated by an INVD/WBINVD instruction. Snoop invalidations do not affect the cacheability control register. The cacheability control register is updated/validated on every fill with the page address of the line that was filled into the cache upon initiation by a load operation. Another cacheability control register is validated on write operations to the bus when the writes are determined to be cacheable.

The data cache 940 supports one read operation and one write operation on each cycle to either independent or dependent addresses. Stalls occur on cache misses or when a data dependency occurs that is not handled by hardware. For example, a stall takes place upon the occurrence of a read operation with a superset dependency on an older write operation that has not yet been cached. A superset dependency is defined as a read operation that requests more bytes than a write operation can supply. Address dependencies are detected by monitoring the number of requested bytes and a limited number of address bits (address bits [9:0]) due to timing constraints so that false dependencies may be detected, resulting in unnecessary stalls.

The store unit 918 transfers data to the data cache 940 through a store queue 942.

The MMX unit 922 is implemented to incorporate an X86 instruction subset called the Multi-Media eXtensions (MMX) thereby supporting a growing number of applications in the areas of communications and multimedia. The MMX unit 922 supports the new instructions and the new data types that are defined by the MMX standard to increase processor performance in the targeted applications. The MMX unit 922 executes a Single Instruction, Multiple Data (SIMD) technique to process multiple operands of 8, 16, or 32 bits in a 64-bit data path to perform highly parallel and computationally intensive algorithms that are typical for multimedia applications. The MMX unit 922 supports 57 new instructions that execute additions, subtractions, multiplies, multiply-accumulates, logical shifts, arithmetic shifts, and several other operations. Most operations are executed on operands of any data type.

While the invention has been described with reference to various embodiments, it will be understood that these embodiments are illustrative and that the scope of the invention is not limited to them. Many variations, modifications, additions and improvements of the embodiments described are possible. For example, those skilled in the art will readily implement the steps necessary to provide the structures and methods disclosed herein, and will understand that the process parameters, materials, and dimensions are given by way of example only and can be varied to achieve the desired structure as well as modifications which are within the scope of the invention. Variations and modifications of the embodiments disclosed herein may be made based on the description set forth herein, without departing from the scope and spirit of the invention as set forth in the following claims.

The disclosed technique for coordinating timing of self-resetting or postcharge-type circuits is not only applicable to the task of accelerating the operation of an instruction cache but is also highly advantageous and suitable for more general problems such as coordinating the timing of pulses transferred chip-wide across a microprocessor, or other large, complex integrated circuit.

What is claimed is:

1. A handshake circuit for usage in a computer system that generates a plurality of dynamic signals in self-resetting signal paths having a signal indicative of whether none of the plurality of dynamic signals in the self-resetting signal paths have occurred, the handshake circuit comprising:

a dynamic differential comparator for generating said signal indicative of whether none of the plurality of dynamic signals in the self-resetting signal paths occurred, wherein the dynamic differential comparator includes:

a) a first line and a second line;

b) a plurality of individual-bit comparison devices coupled to the first line;

c) a timing device coupled to the second line; and d) a differential amplifier having a first input terminal coupled to the first line, a second input terminal coupled to the second line;

a first signal generation circuit coupled to the dynamic differential comparator that generates a "normal operation" signal when said plurality of dynamic signals in the self-resetting signal paths occurred; and a second signal generation circuit coupled to the dynamic differential comparator that generates a "reset" signal when none of the plurality of dynamic signals in the self-resetting signal paths occurred;

the dynamic differential comparator is coupled to a clock line, a tag data line, a cache data line, and a data signal occurrence line for plurality of data paths; wherein the first signal generation circuit further includes a logic for detecting data signals on the clock line the data t the cache data line, the data signal occurrence line for the plurality of data paths in combination and, in response, generating the "normal operation" signal; and the second signal generation circuit further includes a logic for detecting said data signals on the clock line the data line, the cache data line and the data signal occurrence line for the plurality of data paths in combination and, in response, generating the "reset" signal.

2. A handshake circuit according to claim 1, wherein:
the first and second signal generation circuits include a plurality of buffers.

3. A handshake circuit according to claim 1, wherein:
the first and second signal generation circuits include a plurality of signals and delay elements.

4. A handshake circuit for usage in a computer system that generates a plurality of dynamic signals in a self-resetting signal path, the handshake circuit comprising:
a dynamic signal detection circuit coupled to a plurality of self-resetting signal paths;
a dynamic differential comparator coupled to the dynamic signal detection circuit for generating a signal indicative of whether none of the plurality of dynamic signals in the plurality of self-resetting signal paths occurred, wherein the dynamic differential comparator includes:
a) a first line and a second line,
b) a plurality of individual-bit comparison devices coupled to the first line;
c) a timing device coupled to the second line; and
d) a differential amplifier having a first input terminal coupled to the first line, a second input terminal coupled to the second line;
a first signal generation circuit coupled to the dynamic differential comparator that generates a "normal operation" signal when said plurality of dynamic signals in the plurality of self-resetting signal paths occurred; and
a second signal generation circuit coupled to the dynamic differential comparator that generates a "reset" signal when none of the plurality of dynamic signals in the plurality of self-resetting signal paths occurred;
the dynamic differential comparator is coupled to a clock line a tag data line, a cache data line, and a data signal occurrence line for plurality of data paths; wherein
the first signal generation circuit further includes a logic for detecting data signals on the clock line, the data tag line, the cache data line, the data signal occurrence line for the plurality of data paths in combination and, in response, generating the "normal operation" signal; and
the second signal generation circuit further includes a Ionic for detecting said data signals on the clock line, the data tag line, the cache data line and the data signal occurrence line for the plurality of data paths in combination and, in response, generating the "reset" signal.

5. A handshake circuit according to claim 4, wherein:
the dynamic differential comparator which coupled to the first and second signal generation circuits is further configured to determine a plurality of match conditions for said plurality of dynamic signals of said first and second generation circuits.

6. A handshake circuit according to claim 4, wherein:
the first and second signal generation circuits include a plurality of buffers.

7. A handshake circuit according to claim 4, wherein:
the first and second signal generation circuits include a plurality of signals and delay elements.

8. A method of generating a handshake signal for usage in a circuit that generates a plurality of dynamic signals in self-resetting signal paths having a signal indicative of whether none of the plurality of dynamic signals in the self-resetting signal paths have occurred, the method comprising:
dynamically comparing, by a dynamic differential comparator, said plurality of dynamic signals arising in a first signal generation circuit and in a second signal generation circuit to determine a plurality of match conditions of the plurality of dynamic signals; wherein the dynamic differential comparator includes:
a) a first line and a second line;
b) a plurality of individual-bit comparison devices coupled to the first line;
c) a timing device coupled to the second line; and
d) a differential amplifier having a first input terminal coupled to the first line, a second input terminal coupled to the second line;
generating said signal indicative of whether none of the plurality of dynamic signals in the self-resetting signal paths occurred;
generating a "normal operation" signal when said plurality of dynamic signals in the self-resetting signal paths occurred; and
generating a "reset" signal when none of the plurality of dynamic signals in the self-resetting signal paths occurred;
detecting data signals on a clock line a data tag lines, a cache data line, a data signal occurrence line for plurality of data paths in combination and, in response, generating the "normal operation" signal; and
detecting said data signals on the clock lines, the data tag lines, the cache data line and the data signal occurrence line for the plurality of data paths in combination and, in response, generating the "reset" signal.

9. A processor comprising:
an execution engine;
an instruction decoder coupled to the execution engine, the instruction decoder decoding instructions and supplying operations to the execution engine for execution;
a cache coupled to the instruction decoder, the cache supplying instructions to the instruction decoder, the cache having a circuit including:
a handshake circuit that generates plurality of dynamic signals in a self-resetting signal path, the handshake circuit including:
a dynamic signal detection circuit coupled to a plurality of self-resetting signal paths;
a dynamic differential comparator coupled to the dynamic signal detection circuit for generating a signal indicative of whether none of the plurality of dynamic signals in the plurality of self-resetting signal paths occurred; wherein the dynamic differential comparator includes:
a) a first line and a second line;
b) a plurality of individual-bit comparison devices coupled to the first line;
c) a timing device coupled to the second line; and
d) a differential amplifier having a first input terminal coupled to the first line, a second input terminal coupled to the second line;

a first signal generation circuit coupled to the dynamic differential comparator that generates a "normal operation" signal when said plurality of dynamic signals in the plurality of self-resetting signal paths occurred; and a second signal generation circuit coupled to the dynamic differential comparator that generates a "reset" signal when none of the plurality of dynamic signals in the plurality of self-resetting signal paths occurred;

the dynamic differential comparator is coupled to a clock line, a tag data line, a cache data line, and a data signal occurrence line for plurality of data paths; wherein the first signal generation circuit further includes a logic for detecting data signals on the clock line, the data tag lines the cache data line, the data signal occurrence line for the plurality of data paths in combination and, in response, generating the "normal operation" signal; and the second signal generation circuit further includes a logic for detecting said data signals on the clock lines, the data tag lines, the cache data line and the data signal occurrence line for the plurality of data paths in combination and, in response, generating the "reset" signal.

* * * * *